United States Patent
Leigh (10) Patent No.: US 11,543,325 B2
(45) Date of Patent: Jan. 3, 2023

(54) MONITORING MACHINE VIBRATION (71) Applicant: Bently Nevada, LLC, Minden, NV (US)

(72) Inventor: Nigel Trevor Leigh, Minden, NV (US)

(73) Assignee: Bently Nevada, LLC

( * ) Notice: Subject to any disclaimer, the term of this patent is extended or adjusted under 35 U.S.C. 154(b) by 429 days.

(21) Appl. No.: 16/148,449

(22) Filed: Oct. 1, 2018

(65) Prior Publication Data

US 2020/0103312 A1 Apr. 2, 2020

(51) Int. Cl.
 G01M 13/00 (2019.01)
 G01M 13/045 (2019.01)

(52) U.S. Cl.
 CPC ................ *G01M 13/045* (2013.01)

(58) Field of Classification Search
 CPC .................. G01M 13/045; G01M 13/028
 USPC ......................................... 702/34
 See application file for complete search history.

(56) References Cited

U.S. PATENT DOCUMENTS

| | | | | |
|---|---|---|---|---|
| 5,895,857 | A * | 4/1999 | Robinson | G01H 1/003 73/602 |
| 6,591,682 | B1 * | 7/2003 | Lysen | G01H 1/003 702/56 |
| 9,778,080 | B2 * | 10/2017 | Garvey, III | G01D 18/00 |
| 2004/0199348 | A1 * | 10/2004 | Hitchcock | G01M 13/028 702/92 |
| 2011/0251804 | A1 * | 10/2011 | Hess | G05B 19/4065 702/56 |

* cited by examiner

*Primary Examiner* — Leslie J Evanisko
(74) *Attorney, Agent, or Firm* — Mintz Levin Cohn Ferris Glovsky and Popeo, PC; Lisa Adams (57) ABSTRACT

A method can include receiving time-dependent vibration data characterizing a vibration of a machine. The method can also include generating first conditioned vibration data by at least identification of one or more vibrational peaks of intermediate data representative of the received vibration data, temporal interpolation of one or more portions of the intermediate data including the identified one or more vibrational peaks, and widening the one or more vibrational peaks. The method can further include generating a frequency spectrum based on the first conditioned vibration data. The method can also include providing the frequency spectrum to a user.

17 Claims, 7 Drawing Sheets

MONITORING MACHINE VIBRATION

BACKGROUND

In some fields, such as industrial fields, machinery is used that may begin to wear down over time or have an inherent flaw. It can be useful to monitor the state of this machinery for wear and tear, such as wear and tear due to metal-to-metal impacts, in order to prevent damage or provide proper maintenance. Monitoring the state of the machine can involve demodulation of a signal from a sensor coupled to the machine.

Demodulation is a method of extracting information that can be encoded in a signal. Demodulation can be used to detect fault frequencies of a machine (e.g., fault frequencies indicative of a fault in the machine) from vibration signals detected by a sensor coupled to the machine. This can be done, for example, by demodulating the vibration signal to select the fault frequencies. In some cases, the fault frequencies can be generated by an impact event (e.g., when a member of the machine collides against a fault [e.g., crack] in the machine). Fault vibrations associated with such impact events can be overwhelmed by other vibrations in the machine (e.g., low frequency vibrations generated by various moving parts of the machine). Demodulation techniques (e.g., disclosed in U.S. Pat. No. 5,895,857 to Robinson et al.) have been developed to extract fault frequencies from the vibration signal of the machine.

SUMMARY

Various aspects of the disclosed subject matter may provide one or more of the following capabilities.

In one implementation, a method can include receiving time-dependent vibration data characterizing a vibration of a machine. The method can also include generating first conditioned vibration data by at least identification of one or more vibrational peaks of intermediate data representative of the received vibration data, temporal interpolation of one or more portions of the intermediate data including the identified one or more vibrational peaks, and widening the one or more vibrational peaks. The method can further include generating a frequency spectrum based on the first conditioned vibration data. The method can also include providing the frequency spectrum to a user.

One or more of the following features can be included in any feasible combination.

In one implementation, generating the first conditioned vibration data can further include sampling the received vibration data at a predetermined input sampling rate to generate sampled vibration data. The sampled vibration data can include a plurality of vibration values and a plurality of time values corresponding to time of sampling of the plurality of vibration values.

In another implementation, a first time value and a second time value of the plurality of time values can be separated by a sampling time. The sampling time is inversely proportional to the input sampling rate.

In one implementation, generating the first conditioned vibration data can further include rectifying the sampled vibration data to generate the intermediate data. The rectifying can include replacing one or more vibration values of the plurality of vibration values with their absolute values.

In one implementation, generating the first conditioned data can include high-pass filtering the sampled vibration data. The high-pass filtering can include calculating a spectrum of the sampled vibration data, multiplying the determined spectrum with a high-pass filter function having a first filter frequency to generate a first filtered spectrum, and calculating the intermediate data from the first filtered spectrum. Widening a first vibrational peak of the one or more of the identified vibrational peaks can include setting values of one or more vibrational values of the sampled vibration data within a first time window to values obtained by a peak-widening function.

In one implementation, the first time window can include a first time value associated with the first vibrational peak. A duration of the first time window can be inversely proportional to the first filter frequency. In another implementation, the peak-widening function can be one of a rectangular peak-widening function, a trapezoidal peak-widening function, a triangular peak-widening function and a sine-shape peak-widening function. In yet another implementation, the method can further include generating second conditioned vibration data by low-pass filtering the first conditioned vibration data and decimating the low-pass filtered first condition data at a predetermined output sampling rate.

In one implementation, low-pass filtering can include calculating a spectrum of the first conditioned vibration data, multiplying the calculated spectrum with a low-pass filter function to generate a second filtered spectrum, and calculating the second conditioned data from the second filtered spectrum. In another implementation, the output sampling rate can be lower than the input sampling rate. In yet another implementation, the providing can further include modifying an operation of the machine based on the identified fault frequency.

In one implementation, at least one of the receiving, the generating, the identifying and the providing can be performed by at least one data processor forming part of at least one computing system. In another implementation, generating first conditioned vibration data can further include determining the portion of intermediate data by selecting vibration values temporally proximal to at least a first peak of the identified one or more vibrational peaks. The first peak can be the largest of the one or more vibrational peaks.

In one implementation, the method can include identifying a fault frequency of the machine based on the generated frequency spectrum of the first conditioned vibration data, and providing the identified fault frequency to the user. In another implementation, generating the first conditioned vibration data can further include rectifying the temporally interpolated portion of the intermediate data including the one or more vibrational peaks. The rectifying can include replacing one or more vibration values of the temporally interpolated portion of the intermediate data with their absolute values.

In one implementation, a method can include receiving time-dependent vibration data characterizing a vibration of a machine. The method can also include generating first conditioned vibration data by at least identification of one or more vibrational peaks of intermediate data representative of the received vibration data, temporal interpolation of one or more portions of the intermediate data including the identified one or more vibrational peaks, and widening the one or more vibrational peaks. The method can further include providing the first conditioned data to a user. In another implementation, the method can further include generating a frequency spectrum based on the first conditioned vibration data, and providing the first conditioned data to the user.

In one implementation, a system can include at least one data processor (e.g., processor 210), and memory (e.g., memory 212) coupled to the at least one data processor. The memory storing instructions can cause the at least one data processor to perform operations including receiving time-dependent vibration data characterizing a vibration of a machine. The operations can also include generating first conditioned vibration data by at least identification of one or more vibrational peaks of intermediate data representative of the received vibration data, temporal interpolation of one or more portions of the intermediate data including the identified one or more vibrational peaks, and widening the one or more vibrational peaks. The operations can further include generating a frequency spectrum based on the first conditioned vibration data. The operations can also include providing the frequency spectrum to a user.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

In some environments, for example industrial environments, there may be one or more machines that can be monitored. A machine (e.g., a gearbox) can be complex with multiple components that need to be monitored and maintained. The components can develop faults during the course of their operation (e.g., a crack in a component of the gearbox). Faults can appear in the machine long before the machine malfunctions, and therefore detecting a fault at an early stage can prolong (e.g., by performing appropriate maintenance to be performed in a timely manner) the life of the machine. The fault can be detected by detecting a vibration associated with the operation of the machine (e.g., operation of the faulty component). The detected vibration can be characterized by a fault frequency, and the detection of the fault frequency can be indicative of the presence of the fault in the machines. However, vibrations detected from an operating machine can include various unrelated vibrations (e.g., vibrations generated by gear imbalance, misalignment between gears and the driving components, etc.) that can make it challenging to accurately detect vibrations having the fault frequency. For example, existing techniques of fault frequency detection can require extensive computational processing and can have low signal-to-noise ratio. The existing techniques can generate spurious spectral peaks that can be misleading. The current subject matter can provide an improved fault detection system that can detect machine vibrations of a desirable frequency (e.g., fault frequency) in the presence of undesirable machine vibrations and reduce generation of spurious spectral peaks.

In some implementations of the fault detection system described in this application, vibrations of a machine can be detected and processed to identify a fault frequency of the machine. The fault detection systems can suppress undesirable vibration signals that do not correspond to the fault frequency which can result in high signal-to-noise ratio. Undesirable vibration signals can be generated by other vibrations of the machine, spurious vibrations generated by a processing algorithm that processes vibration signals from the machine, and the like. For example, presence of faults in a machine can result in impulse events (e.g., periodic impacts between machine parts) that can have a low repetition frequency (e.g., several Hertz). However, the frequency spectrum of the impulse events can include high frequency components (e.g., several kHz). It can be challenging to extract the low repetition frequency from the frequency spectrum of the impulse events in an efficient and timely manner, and present the extracted repetition frequency to an analyst.

In some instances, fault frequency detection can be improved, for example, by interpolating vibration data to accurately identify/determine peaks in the vibration data, and by widening the identified peaks before calculating the vibration spectrum. In some implementations, peaks of the vibration data can be identified, and vibration data values close to the identified peak can be interpolated to accurately identify/determine the peak value. Accurate identification of the peak vibration values can result in fewer/smaller spurious peaks in the vibration spectrum and improve the identification of fault frequencies.

Figure 1:
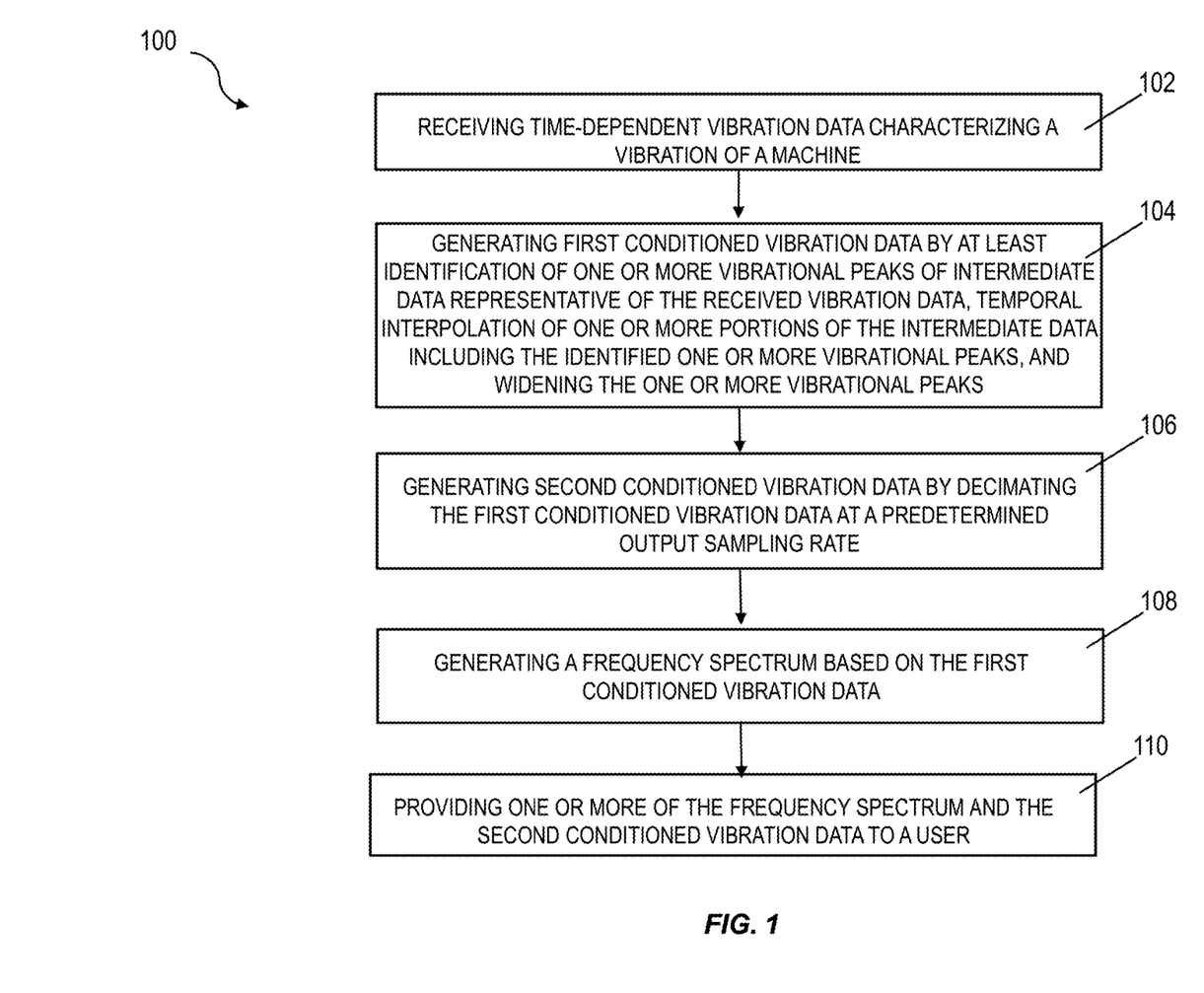
FIG. 1 is a flow chart of an exemplary method for detecting a fault frequency of a machine.

FIG. 1 is a flow chart 100 of an exemplary method for detecting a fault frequency of a machine. At step 102, time-dependent vibration data (e.g., time-based) characterizing a vibration of the machine (e.g., vibrations generated by the operation of the machine) is received. For example, a vibration sensor can detect a time-dependent vibration data associated with the operation of a machine (e.g., data characterizing the vibration of the machine over a period of time), and the detected vibration data can be received by a peak detection system (e.g., a computing system configured to detect/identify repetitive impulse events in the vibration signal and/or compare the detected impulse events with predetermined fault frequencies, repetitive impulse events in the vibration signal). In some implementations, the received vibration data can be sampled at an input sampling rate.

Figure 2:
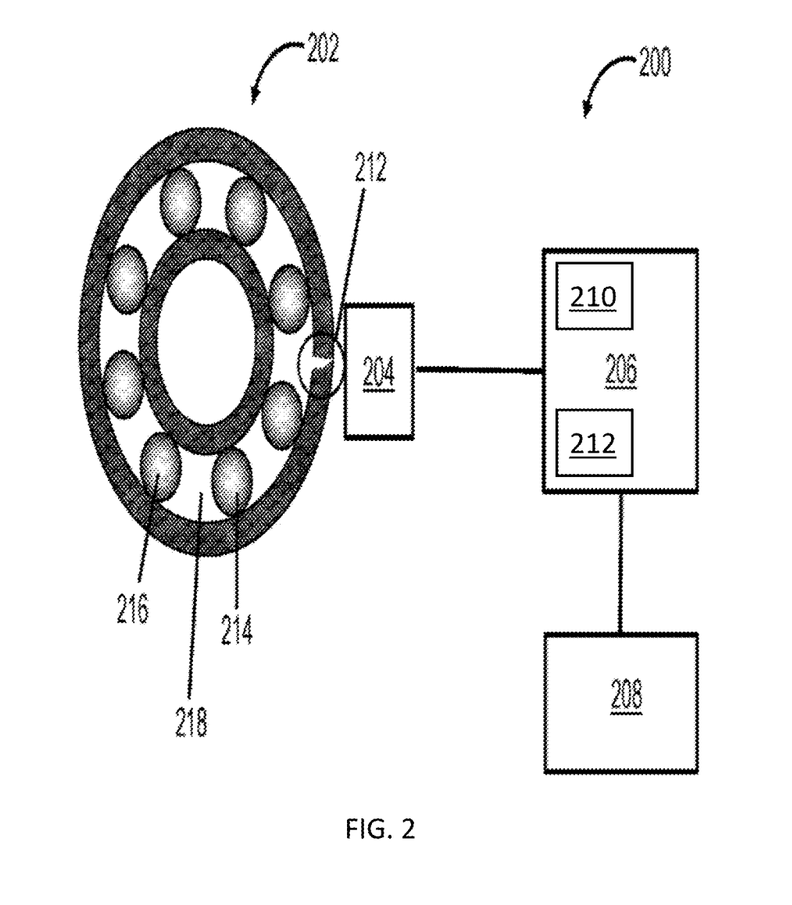
FIG. 2 illustrates an exemplary fault detection system configured to detect fault frequencies associated with the operation of a machine.

FIG. 2 illustrates an exemplary fault detection system 200 configured to detect fault frequencies associated with the operation of machine 202. The fault detection system 200 can include a vibration sensor 204 and a peak-detection system 206. The vibration sensor 204 can detect various vibrations generated by the machine 202. Certain vibrations (e.g., vibrations characterized by a fault frequency) detected by the vibration sensor 204 can be indicative of a fault 212 in the machine 202. As an example, the vibration having the fault frequency can be generated when the ball bearings 214 and 216 interact with the fault 212 as they move along the channel 218 (e.g., a bearing race) in the machine. If the ball bearings 214 and 216 are moving at a constant speed, they will interact with the fault 212 (e.g., at regular intervals) to generate the vibration indicative of the presence of the fault.

Data characterizing the vibrations measured by the vibration sensor 204 ("vibration data") can be relayed to the peak-detection system 206.

The vibration data received by the peak-detection system 206 can be analyzed to determine the various frequency components of the measured vibrations. This can be done, for example, by demodulating the received vibration data by detecting peaks (e.g., a local maximum value) in the measured vibration data. The demodulation process can involve performing multiple operations (e.g., filtering, up-sampling, down-sampling, rectification, etc.) on the received vibration data that can modify the received vibration data. For example, if the vibration data is in an analog form, it can be converted to sampled vibration data by digitizing the analog vibration data (e.g., by sampling the analog vibration data at an input sampling rate). The sampled vibration data can include an array of vibration values and an array of time values corresponding to the time of sampling of the various vibration values. Adjacent time values in the array of time values can be separated by a sampling time which is inversely proportional to the input sampling rate. In some implementations, the vibration data received by the peak-detection system 206 can be in the digitized form (e.g., the vibration sensor 204 can digitize the vibration data before broadcasting it to the peak-detection system 206).

The peak-detection system 206 can include a high-pass filter that can attenuate (e.g., remove) low frequency components of the received vibration data/sampled vibration data. For example, the high-pass filter can receive the sampled vibration data and remove the low frequency components generated by moving components of the machine 202 that are not indicative of the fault (e.g., fault 212) of the machine 202. In some implementations, high-pass filtering can be achieved by calculating a spectrum of the sampled vibration data (e.g., through fast fourier transform) and by multiplying the calculated spectrum with a high-pass filter function. The high-pass filter function can include a characteristic high-pass filter frequency such that spectral frequencies of the calculated spectrum below the characteristic high-pass filter frequency are attenuated (e.g., removed). Multiplying the calculated spectrum of sampled vibration data with the high-pass filter function can generate a filtered spectrum of the sampled vibration data. The filtered spectrum can be converted to the time domain (e.g., by using fast fourier transform) to generate intermediate data. In some implementations, high-pass filtering can be achieved using digital signal processing techniques (e.g., Finite Impulse Response [FIR], Infinite Impulse Response [IIR], and the like) applied on the sampled vibration data. A user can choose the characteristic high-pass filter frequency (e.g., corner frequency). For example, he characteristic high-pass filter frequency can be about 2 kHz. In some implementations, the peak detection system can also include a rectifier (e.g., a full wave rectifier) that can rectify the intermediate data and/or the sampled vibration data. For example, the rectifier can replace the vibration values in the intermediate data with their absolute values.

Returning to FIG. 1, at step 104, a first conditioned vibration data is generated by identification of one or more vibrational peaks of the intermediate data representative of the received vibration data. Temporal interpolation can be performed on a portion of the intermediate data that can include the identified one or more vibrational peaks. For example, temporal interpolation can be performed on vibration data values that are temporally proximal to the identified one or more vibrational peaks. This can allow for accurate determination of peak values of the received vibration data. Interpolation of the received vibration data (or a portion of the received vibration data) can be achieved, for example, by using interpolation techniques such as linear interpolation, bi-linear interpolation, quadratic interpolation, cubic interpolation, and the like.

Vibrational peaks (e.g., a vibrational value temporally surrounded by lower vibration values) can be identified from the temporally interpolated vibrational data. This can be done, for example, by searching for a peak vibrational value (e.g., a local maximum in a plot of interpolated vibrational values versus interpolated time values) in the interpolated vibrational data. Interpolating the vibration values can allow for accurate identification of peak vibration values and the time of sampling of the peak vibration values. Accurate identification of the peak vibration values can improve the identification of the fault frequencies. For example, it can increase the signal-to-noise ratio in the frequency spectrum of the received vibration data (e.g., by suppressing spectral components of frequencies that are not fault frequencies). A higher signal-to-noise ratio can allow for a more accurate and a more sensitive detection of fault frequencies. For example, fault frequencies can be detected in the presence of vibrations (e.g., strong machine vibrations, environmental vibrations, spurious vibrations generated by the processing algorithm, etc.) that are not indicative of the fault frequencies.

The first conditioned data can be generated by widening the identified peaks of the interpolated vibrational values within a predetermined time window. Widening an identified peak can involve, for example, changing the vibrational values that are temporally located in the predetermined time window. The predetermined time window can include the time associated with the identified peak (e.g., time of sampling of the identified peak). In one implementation, vibrational values in the predetermined time window are set to the value of the identified peak (e.g., by using a rectangular-shaped widening function). In other implementations, the vibrational values in the predetermined time window can be determined by a peak-widening function (e.g., trapezoidal/triangular/sine-shape peak-widening function). The peak widening function can receive the vibration values in the predetermined time window (e.g., including the identified peak) and the discrete times of sampling in the predetermined time window as inputs, and can generate the vibrational values in the predetermined time window.

Returning to FIG. 1, at step 106, a second conditioned vibration data is generated by decimating the first conditioned vibration data at a predetermined output sampling rate. For example, the first conditioned data can be filtered by a low pass filter (e.g., anti-alias filter) and the filtered condition data can be down-sampled at the predetermined output sampling rate. Low-pass filtering can prevent high frequency vibration data from corrupting low frequency vibration data during the fault frequency detection process. Down-sampling the filtered conditioned data can involve, for example, keeping every $n^{th}$ (e.g., every second, third, fourth, tenth, etc.) vibrational value and disregarding other vibrational values. The threshold frequency of the low-pass filter in the decimation process can be inversely proportional to the output sampling rate. In some implementations, the output sampling rate can be lower than the input sampling rate (e.g., one-tenth of the input sampling rate).

The low-pass filter can attenuate (e.g., remove) high frequency components of the down-sampled data. In some implementations, low-pass filtering can be achieved by calculating a spectrum of the down-sampled data (e.g., through fast fourier transform) and by multiplying the determined spectrum with a low-pass filter function. The low-pass filter function can include a characteristic low-pass filter frequency such that spectral frequencies above the characteristic low-pass filter frequency are attenuated (e.g., removed). Multiplying the spectrum of the down-sampled data with the low-pass filter function can generate a filtered spectrum of the down-sampled data. The filtered spectrum can be converted to the time domain (e.g., by using fast fourier transform) to generate the second conditioned vibration data. In some implementations, low-pass filtering can be achieved using digital signal processing techniques (e.g., Finite Impulse Response [FIR], Infinite Impulse Response [IIR], and the like).

Returning to FIG. 1, at step 108, a fault frequency of the machine can be identified from a frequency spectrum of the second conditioned vibration data. A frequency spectrum of the second conditioned vibration data can be determined (e.g., through fast fourier transform) and one or more fault frequencies can be determined from the spectrum. In some implementations, a spectral component of the frequency spectrum that has an amplitude above a threshold value can be designated as a fault frequency.

At step 110, one or more of the identified fault frequency (or fault frequencies), the second conditioned vibration data and frequency spectrum of the second conditioned vibration data can be provided to a user (e.g., an operator monitoring the system). This can be done, for example, by sending one or more of the identified fault frequency, the second conditioned vibration data and frequency spectrum to the user computing device (e.g., user computing device 208). In some implementations, the identified fault frequency can be compared with a database of predetermined fault frequencies of the machine and machine components corresponding to the fault frequencies. Based on the comparison, the machine component with a fault can be identified and provided to the user. In some implementations, the user computing device 208 can provide an operational signal that can modify an operation of the machine or provide an alert. For example, the user computing device 208 can shut-down the machine when a fault frequency is detected.

Figure 3:
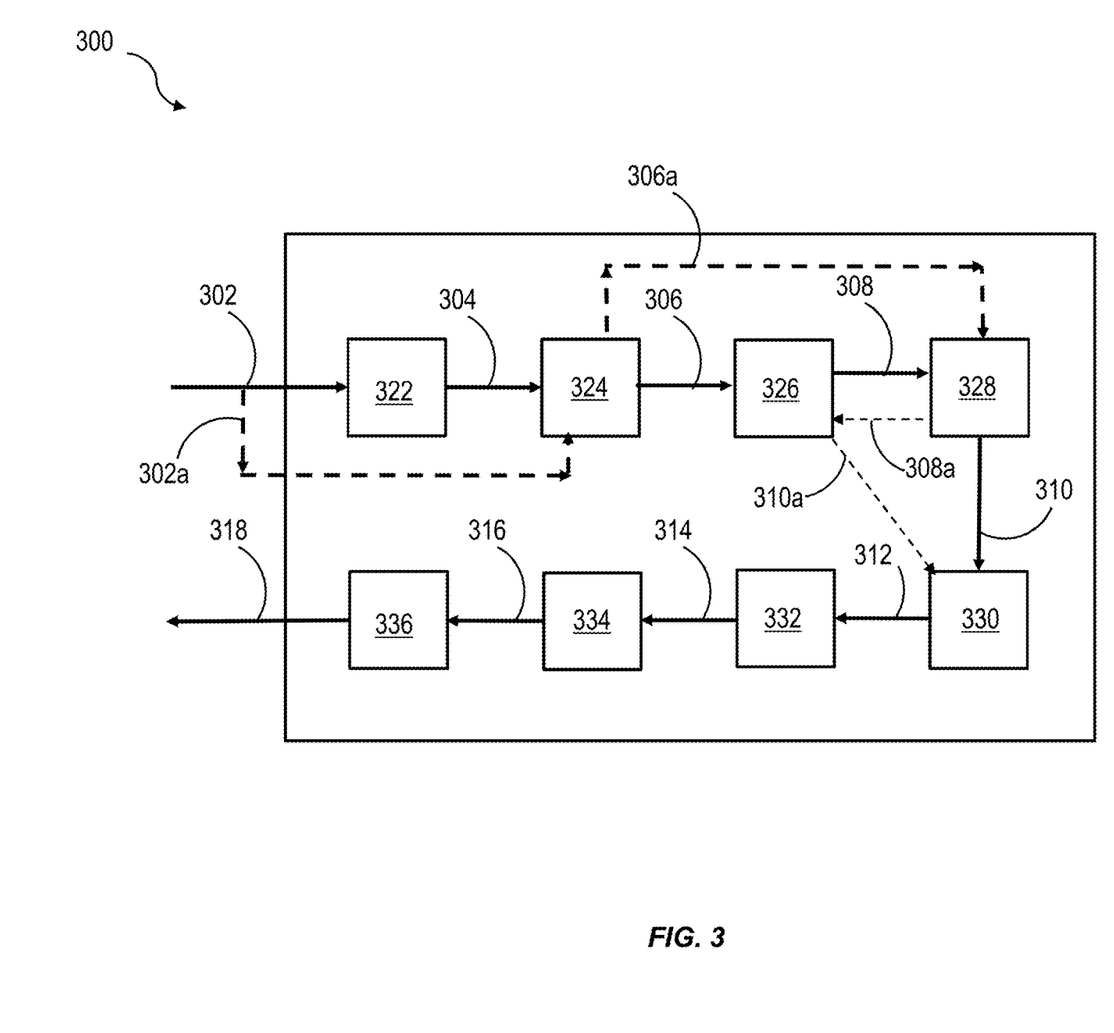
FIG. 3 illustrates an exemplary schematic of a peak detection system 300.

FIG. 3 illustrates an exemplary schematic of a peak-detection system 300. The peak detection system 300 can receive an analog vibration data 302 (e.g., vibrational signal from a vibration sensor) as an input and produce an output 318 indicative of the fault frequency and/or faulty machine component generating the fault frequency. The peak detection system can include a sampling unit 322 that can receive the analog vibration data 302 and sample it at an input sampling rate to generate a digitized sampled vibration data 304. The peak detection system 300 can include a high-pass filter 324 that can receive the sampled vibration data 304 and generate a filtered vibration data 306 whose low frequency components are attenuated. In some implementations, an input vibration data 302a which is digitized (e.g., by vibration sensor, an intermediate sampling unit not included in the peak-detection system 300, etc.) can be directly received by the high pass filter 324.

The peak detection system 300 can include a rectifier 326 (e.g., full wave rectifier) that can receive the filtered vibration data 306 of the high-pass filter 324 and rectify it to generate intermediate data 308. The peak detection system 300 can further include a peak interpolator 328 that can receive the intermediate data 308, identify one or more peaks in the intermediate data 308, and perform peak interpolation on a portion of the intermediate data 308 temporally proximal to the identified peak to generate rectified-interpolated data 310. In some implementations, the peak interpolator 328 can directly receive a filtered vibration data 306a from the high-pass filter 324 and perform peak interpolation on the filtered vibration data 306a. The interpolated data 308a generated by interpolating the vibration data 306a can be received and rectified by the rectifier 326 to generate interpolated-rectified data 310a. The interpolated-rectified data 310a/rectified-interpolated data 310 can include information of accurate peak values of the intermediate data 308.

The peak detection system 300 can include a peak widener 330 that can receive the rectified-interpolated data 310/interpolated-rectified data 310a (e.g., which can include the accurate peak values of intermediate data 308), and perform peak widening of the received data to generate first conditioned data 312. The first conditioned data 312 can be received by a decimating unit 332. The decimating unit 332 can apply a low-pass filter to the first conditioned data and down-sample the filtered data at an output-sampling rate to generate a second conditioned data 314. A spectrum generator 334 of the peak detection system 300 can receive the second conditioned data 314 and generate a vibration spectrum 316 which can be a frequency spectrum of the second conditioned data 314. The peak detection system 300 can further include a fault identifier 336 that can receive the vibration spectrum 316, and identify fault frequencies. The fault identifier 336 can compare the identified fault frequency with a database of predetermined fault frequencies of the machine and machine components corresponding to the fault frequency. Based on the comparison, the machine component with a fault can be identified and provided to the user via the output 318. In some implementations, the machine component with a fault can be identified and provided to the user via second conditioned data 314 and/or vibration spectrum 316.

Figure 4:
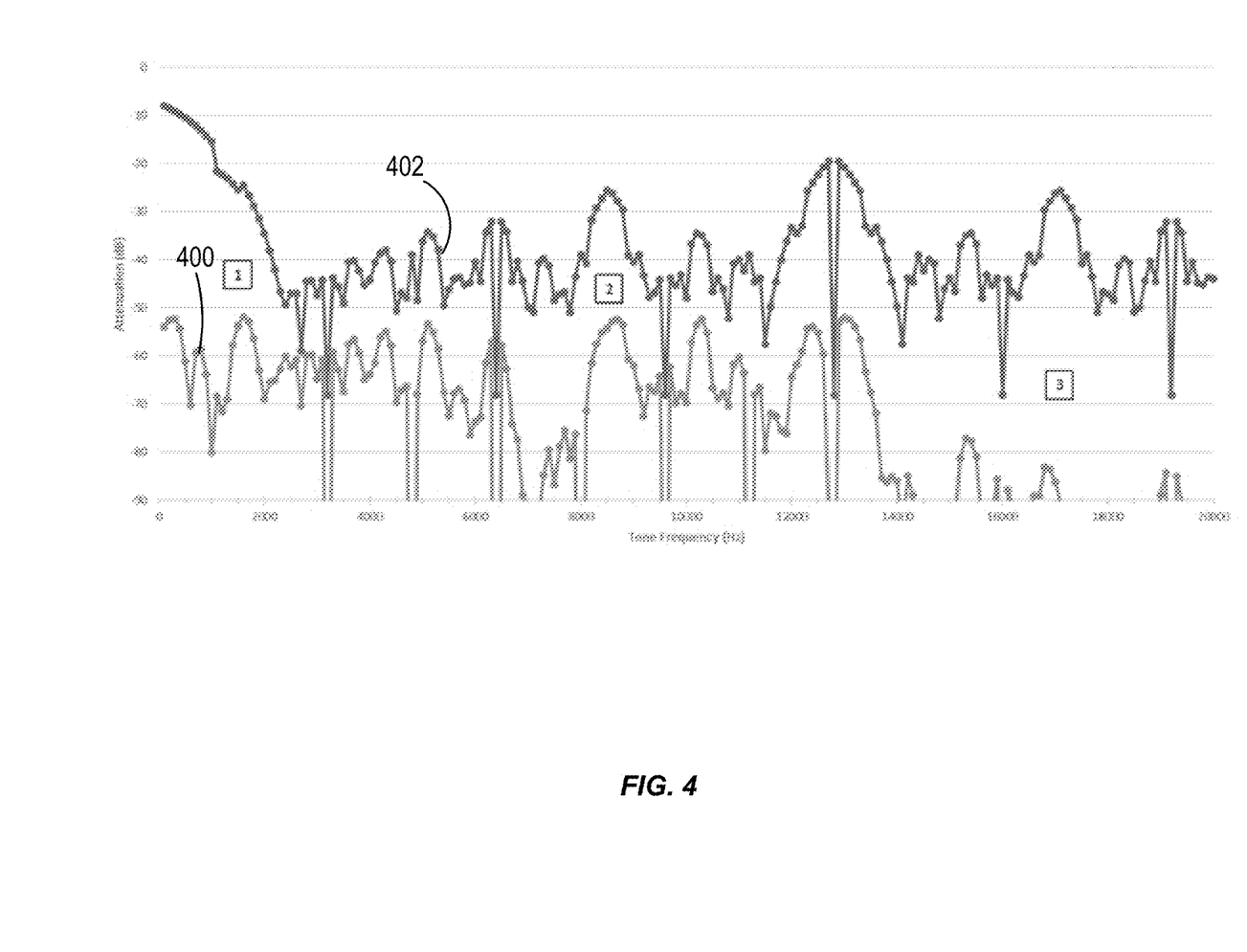
FIG. 4 illustrates an exemplary plot of highest peaks in the various spectra generated by the peak detection system of FIG. 3 in response to various sinusoidal signals as inputs.

FIG. 4 illustrates an exemplary plot 400 of highest peaks in the various spectra generated by the peak detection system 300 in response to various sinusoidal signals as inputs. Sinusoidal signals of various frequencies ranging from 100 Hertz (Hz) to 20 Kilohertz (KHz) in steps of 100 Hz are provided as inputs to the peak detection system 300 (e.g., as input vibration data 302). The inputs can be sampled with an input sampling rate (e.g., at 51.2 kHz by sampling unit 322). The output spectrum (e.g., vibration spectrum 316) for each sinusoidal input can be generated by performing peak interpolation, peak widening, decimation (e.g., down-sampling and low-pass filtering) and spectrum generation as described in FIG. 3. For each output spectrum (e.g., corresponding to each input sinusoidal signals), the highest spectral peak is determined and plotted. Since the sinusoidal input signals do not incorporate a fault frequency, it can be desirable that the highest spectral peak corresponding to the sinusoidal input is small (e.g., zero). Comparison of the plot of spectral peaks 400 using an example implementation of the peak detection described in this application with the plot of spectral peaks 402 generated using existing peak detection algorithm indicates that the example implementation of the peak detection system described in this application is better at suppressing frequencies that do not correspond to a fault frequency.

Figure 5A:
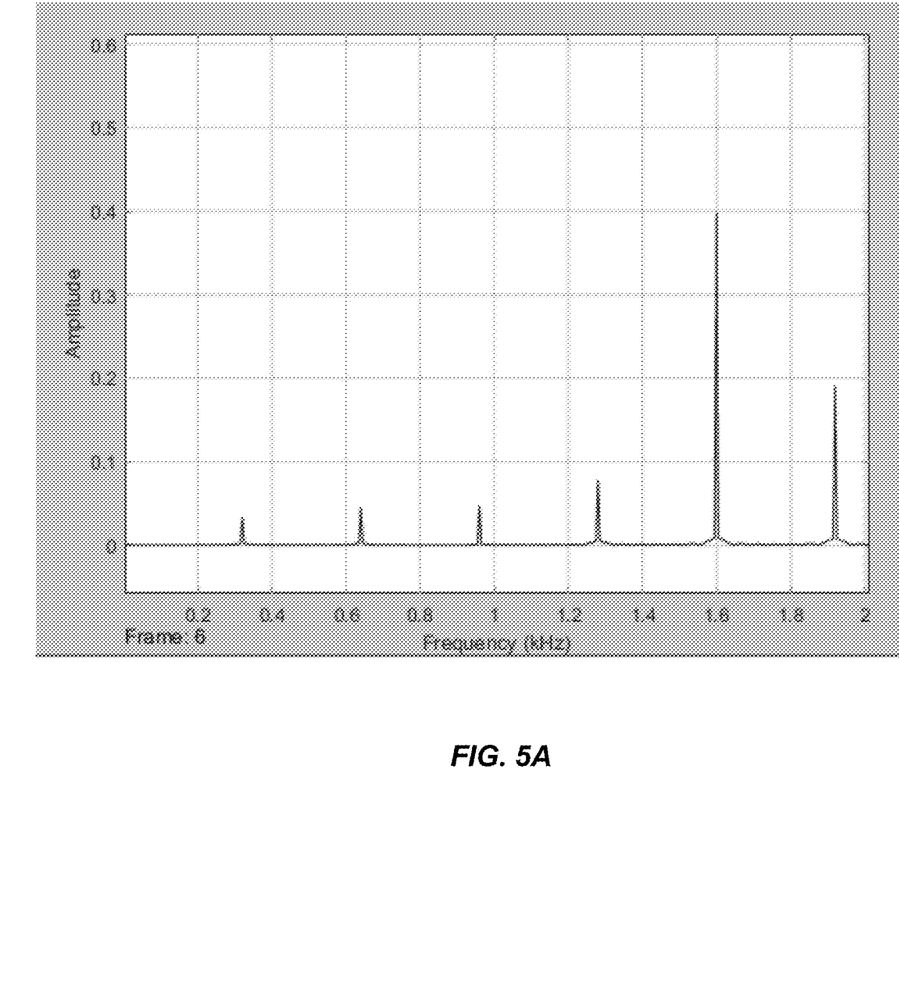
FIG. 5A illustrates an exemplary output signal spectrum from an implementation of existing peak detection algorithm.
Figure 5B:
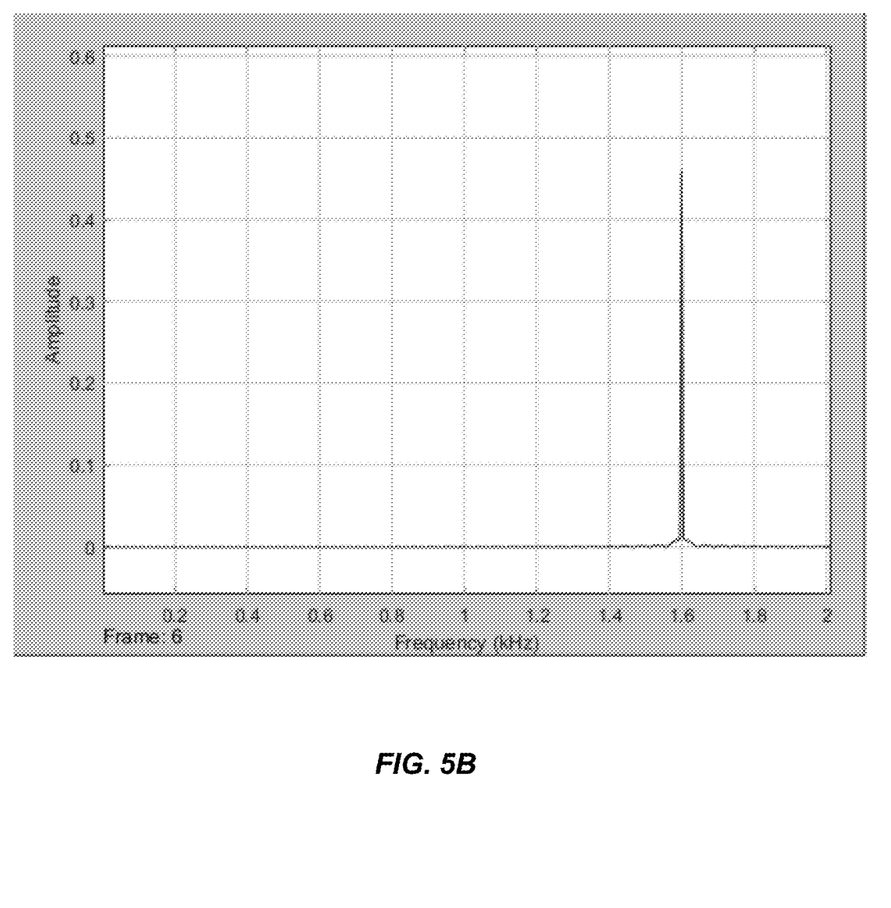
FIG. 5B illustrates an exemplary output signal spectrum from an implementation of the peak detection system described in FIG. 3.

FIG. 5A illustrates an exemplary output signal spectrum from an implementation of existing peak detection algorithm in response to a pulsed signal with 1.6 kHz repetition rate. FIG. 5A is indicative of presence of spurious peaks at frequencies that do not correspond to the repetition rate of the pulsed signal. FIG. 5B illustrates an exemplary output signal spectrum from an implementation of the peak detection system 300 in response to a pulsed signal with 1.6 kHz repetition rate. FIG. 5B illustrates that spurious frequencies (e.g., frequencies other than the repetition rate) are suppressed.

Figure 6:
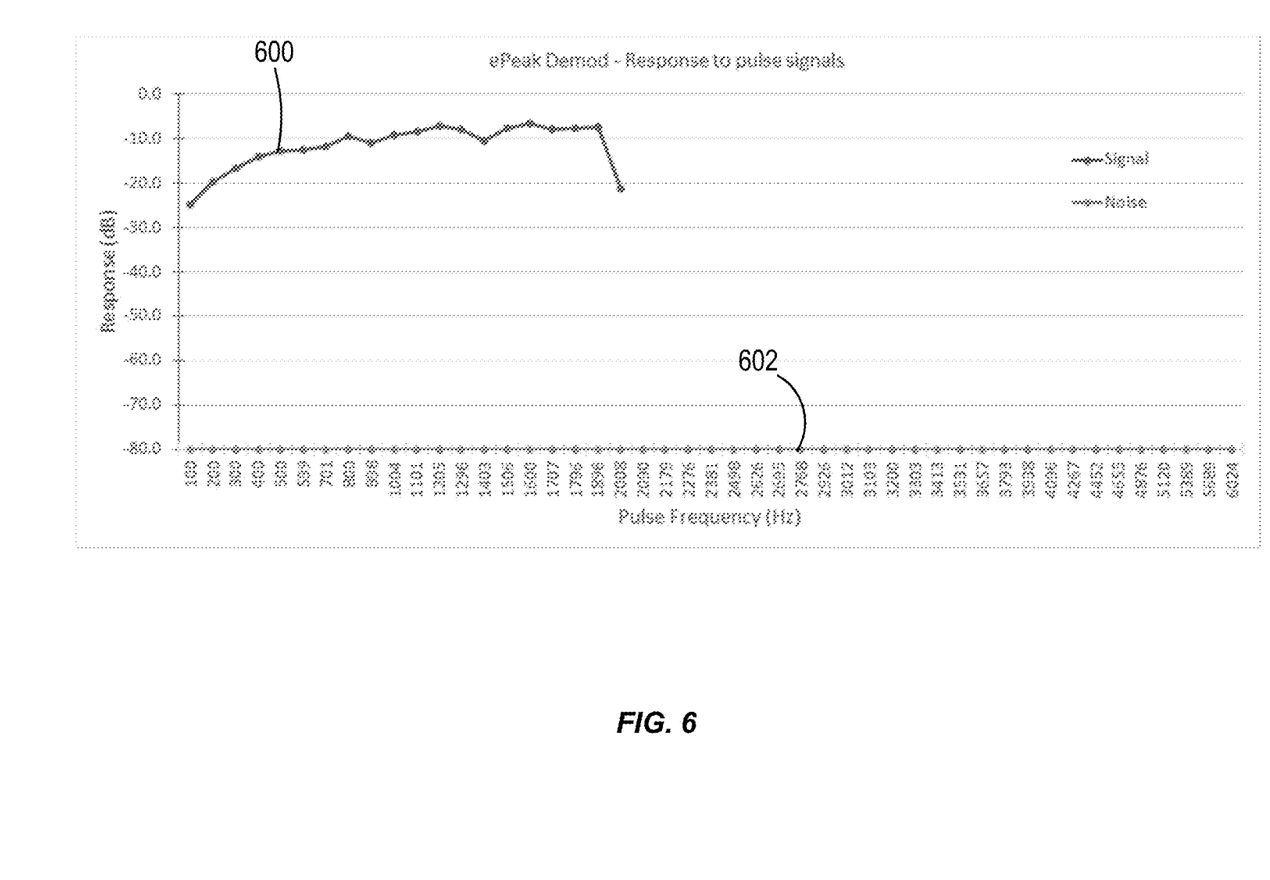
FIG. 6 illustrates exemplary plot of highest spectral peaks in the various spectra generated by the peak detection system of FIG. 3 in response to the various signal pulses of various repetition frequencies.

FIG. 6 illustrates an exemplary plot 600 of highest spectral peaks in various spectra generated by the example peak detection system 300 in response to the various signal pulses of various repetition frequencies. The signal pulses have a time duration of about 20 microseconds and repetition rate ranging from 100 Hz to 6 kHz in frequency steps of at least 100 Hz. In some implementations, the frequency step size can increase at higher frequencies (e.g., frequencies approaching 6 kHz). The input pulses can be sampled with an input sampling rate (e.g., at 102.4 kHz by sampling unit 322). The output spectrum (e.g., vibration spectrum 316) for each input signal can be generated by performing peak interpolation, peak widening, decimation (e.g., down-sampling and low-pass filtering) and spectrum generation as described in FIG. 3. The duration of predetermined time window in peak-widening process can be inversely proportional to the output sampling rate. Noise signal plot 602 represents spurious spectral peaks in vibration spectrum 316 that do not represent the repetition rate in input signal (e.g., input signal 302). FIG. 6 illustrates that the noise signal (represented by plot 602) is much smaller than input peak signal (represented by the plot 600) of spectral peaks of input signal detected by the peak detection system by several orders of magnitudes (e.g., by 10-15 dB). This indicates that the peak detection system (e.g., peak detection system 300) can suppress spurious noise signal.

Peak detection system described in this application can provide one or more advantages over existing fault frequency detection systems. For example, peak detection system (e.g., peak detection system 300) can include a peak interpolator (e.g., peak interpolator 328) and a peak widener (e.g., peak widener 330) that can interpolate data representative of detected vibration and widen the peaks of the interpolated data. This can allow the peak interpolation system to lower signal-to-noise ratio in the output frequency spectrum (e.g., amplitudes of frequencies that do not correspond to the fault frequency are suppressed relative to the amplitude of the fault frequency). This can reduce/prevent generation of spurious peaks and allow for improved accuracy of detection of fault frequencies of the machine. For example, this can prevent inaccurate/delayed diagnosis of machine faults (e.g., by an analyst) and result in prolonged reliability and/or service life. The peak detection system can allow for detection of fault frequencies in the presence of vibrational noise (e.g., vibrations generated by slow moving parts of the machine, environmental noise, etc.).

Other embodiments are within the scope and spirit of the disclosed subject matter. For example, in some implementations, spurious peaks can be suppressed by increasing the sampling rate of input signal (e.g., by sampling unit 322) followed by increasing the rate of down sampling by decimating unit 332. In some implementations, peak to peak measurement of vibration can be performed on the intermediate data and/or the sampled vibration data (e.g., peak to peak measurement can be performed instead of rectification).

Certain exemplary embodiments are described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a wireless network, a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A computer implemented method comprising:
    receiving, by one or more processors, time-dependent vibration data characterizing a vibration of a machine, wherein the time-dependent vibration data is detected by one or more vibration sensors coupled to the machine and configured to detect the vibration of the machine;
    generating, by the one or more processors, first conditioned vibration data, by:
        sampling, by the one or more processors, the time-dependent vibration data at a predetermined input sampling rate to generate sampled vibration data, wherein the sampled vibration data comprises a plurality of vibration values and a plurality of time values corresponding to time of sampling of the plurality of vibration values,
        identifying, by the one or more processors, one or more vibrational peaks of intermediate data representative of the time-dependent vibration data, wherein the intermediate data is generated from the sampled vibration data,
        executing, by the one or more processors, a temporal interpolation of one or more portions of the intermediate data comprising the one or more vibrational peaks, wherein the temporal interpolation comprises determining at least a first portion of the intermediate data by selecting vibration values temporally proximal to at least a first vibrational peak of the one or more vibrational peaks, and
        widening, by the one or more processors, the one or more vibrational peaks;
    generating, by the one or more processors, a frequency spectrum based on the first conditioned vibration data;
    identifying, by the one or more processors, a fault frequency from the frequency spectrum by comparing the frequency spectrum with a set of predetermined fault frequencies of the machine, the fault frequency being indicative of a machine fault; and
    providing, by the one or more processors, a modification of an operation of the machine based on the fault frequency to reduce the machine fault, the modification of the operation of the machine comprising shutting down the machine.

2. The computer implemented method of claim 1, wherein a first time value and a second time value of the plurality of time values are separated by a sampling time, wherein the sampling time is inversely proportional to the input sampling rate.

3. The computer implemented method of claim 1, wherein generating the first conditioned vibration data further comprises rectifying the sampled vibration data to generate the intermediate data, wherein rectifying comprises replacing one or more vibration values of the plurality of vibration values with their absolute values.

4. The computer implemented method of claim 1, wherein generating the first conditioned data comprises high-pass filtering the sampled vibration data, wherein the high-pass filtering is based on a high-pass filter function having a first filter frequency.

5. The computer implemented method of claim 4, wherein widening the first vibrational peak of the one or more of the identified vibrational peaks comprises setting values of one or more vibrational values of the sampled vibration data within a first time window to a vibrational value of the first vibrational peak, the first time window comprises a first time value associated with the first vibrational peak.

6. The computer implemented method of claim 5, wherein a duration of the first time window is inversely proportional to the first filter frequency.

7. The computer implemented method of claim 4, wherein the peak-widening function is one of a rectangular peak-widening function, a trapezoidal peak-widening function, a triangular peak-widening function and a sine-shape peak-widening function.

8. The computer implemented method of claim 1, further comprising generating second conditioned vibration data by low-pass filtering the first conditioned vibration data and decimating the low-pass filtered first condition data at a predetermined output sampling rate.

9. The computer implemented method of claim 8, wherein the output sampling rate is lower than the input sampling rate.

10. The computer implemented method of claim 1, wherein the machine fault corresponds to a machine component.

11. The computer implemented method of claim 1, wherein the first peak is the largest of the one or more vibrational peaks.

12. The computer implemented method of claim 1, further comprising:
providing an alert comprising the identified machine fault.

13. The method of claim 12, wherein the time-dependent vibration data comprises analog vibration data and sampling the time-dependent vibration data, comprises sampling the analog vibration data to generate sampled vibration data in a digitized format.

14. The computer implemented method of claim 1, wherein generating the first conditioned vibration data further comprises rectifying the temporally interpolated portion of the intermediate data comprising the one or more vibrational peaks, wherein rectifying comprises replacing one or more vibration values of the temporally interpolated portion of the intermediate data with their absolute values.

15. A computer program product comprising a non-transitory machine-readable medium storing instructions that, when executed by at least one programmable processor, cause the at least one programmable processor to perform operations comprising:
receiving time-dependent vibration data characterizing a vibration of a machine, wherein the time-dependent vibration data is detected by one or more vibration sensors coupled to the machine and configured to detect the vibration of the machine;
generating first conditioned vibration data, by:
sampling the vibration data at a predetermined input sampling rate to generate sampled vibration data, wherein the sampled vibration data comprises a plurality of vibration values and a plurality of time values corresponding to time of sampling of the plurality of vibration values,
identifying one or more vibrational peaks of intermediate data representative of the vibration data, wherein the intermediate data is generated from the sampled vibration data,
executing a temporal interpolation of one or more portions of the intermediate data comprising the one or more vibrational peaks, wherein the temporal interpolation comprises determining at least a first portion of the intermediate data by selecting vibration values temporally proximal to at least a first vibration peak of the identified one or more vibrational peaks, and
widening the one or more vibrational peaks;
generating a frequency spectrum based on the first conditioned vibration data;
identifying, by the one or more processors, a fault frequency from the frequency spectrum by comparing the frequency spectrum with a set of predetermined fault frequencies of the machine, the fault frequency being indicative of a machine fault; and
providing, by the one or more processors, a modification of an operation of the machine based on the fault frequency to reduce the machine fault, the modification of the operation of the machine comprising shutting down the machine.

16. The computer program product of claim 15, further comprising:
providing the first conditioned data to the user.

17. A system comprising:
at least one data processor;
memory coupled to the at least one data processor, the memory storing instructions to cause the at least one data processor to perform operations comprising:
receiving time-dependent vibration data characterizing a vibration of a machine, wherein the time-dependent vibration data is detected by one or more vibration sensors coupled to the machine and configured to detect the vibration of the machine;
generating first conditioned vibration data, by:
sampling the vibration data at a predetermined input sampling rate to generate sampled vibration data, wherein the sampled vibration data comprises a plurality of vibration values and a plurality of time values corresponding to time of sampling of the plurality of vibration values,
identifying one or more vibrational peaks of intermediate data representative of the vibration data, wherein the intermediate data is generated from the sampled vibration data,
executing a temporal interpolation of one or more portions of the intermediate data comprising the one or more vibrational peaks, wherein the temporal interpolation comprises determining at least a first portion of the intermediate data by selecting vibration values temporally proximal to at least a first vibration peak of the identified one or more vibrational peaks, and
widening the one or more vibrational peaks;
generating a frequency spectrum based on the first conditioned vibration data;
identifying a fault frequency from the frequency spectrum by comparing the frequency spectrum with a set of predetermined fault frequencies of the machine, the fault frequency being indicative of a machine fault; and
providing, by the one or more processors, a modification of an operation of the machine based on the fault frequency to reduce the machine fault, the modification of the operation of the machine comprising shutting down the machine.

* * * * *